UNITED STATES PATENT OFFICE.

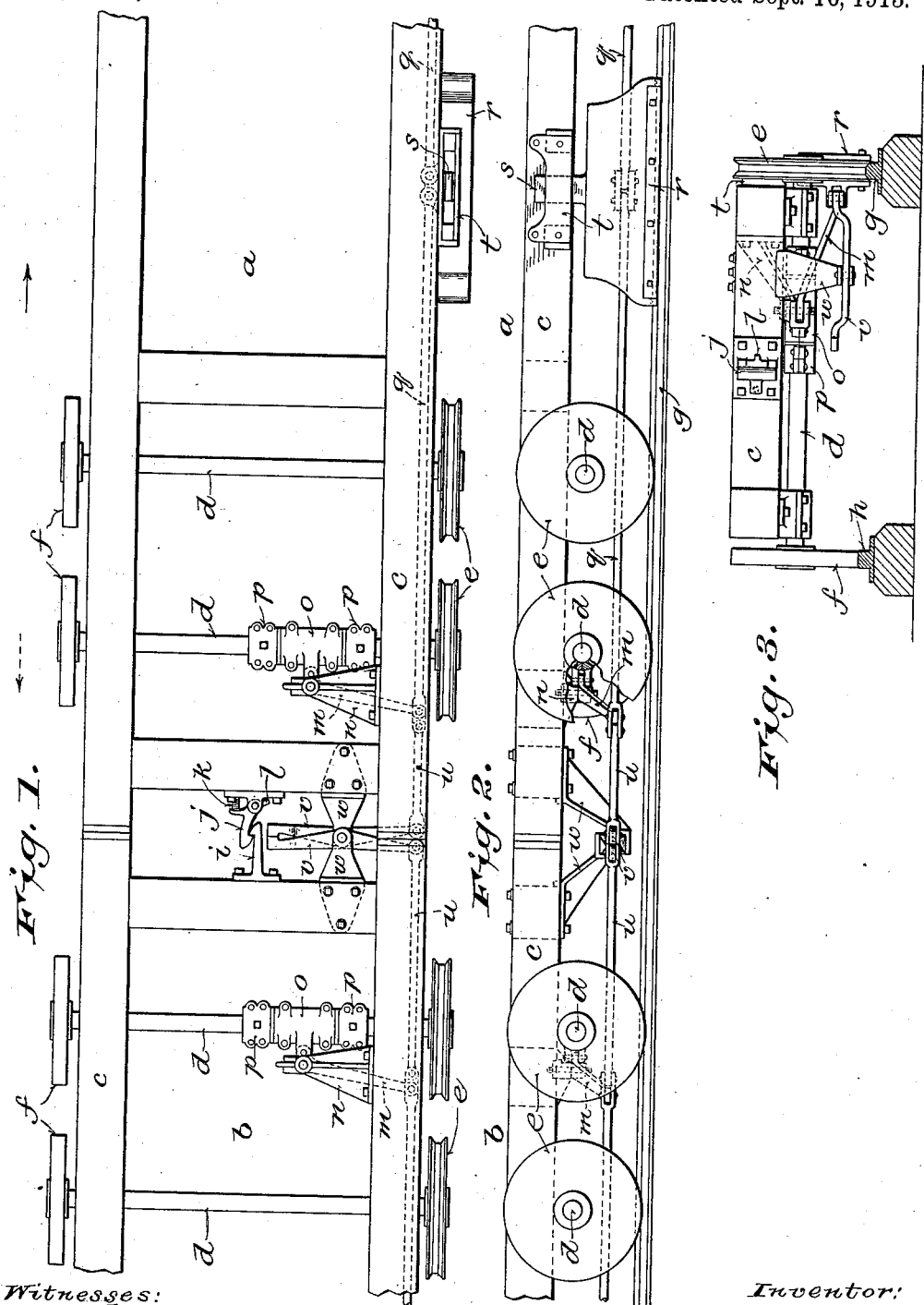

GEORGE M. PELTON, OF MILWAUKEE, WISCONSIN, ASSIGNOR TO THE FILER AND STOWELL COMPANY, OF MILWAUKEE, WISCONSIN, A CORPORATION OF WISCONSIN.

SAWMILL-CARRIAGE OFFSET.

1,073,166.  Specification of Letters Patent.  Patented Sept. 16, 1913.

Application filed November 1, 1911. Serial No. 657,954.

*To all whom it may concern:*

Be it known that I, GEORGE M. PELTON, a citizen of the United States, residing at Milwaukee, in the county of Milwaukee and State of Wisconsin, have invented certain new and useful Improvements in Sawmill-Carriage Offsets, of which the following is a specification, reference being had to the accompanying drawing, forming a part thereof.

This invention relates to sectional or main and auxiliary carriages which are provided with mechanism for moving the carriage frames or log supports toward the saw plane when they are fed forward and away from said plane when they are run back or "gigged" so that the log or timber from which a cut has been made will not come in contact with the saw in running back or "gigging".

The main object of the invention is to automatically and operatively connect the offsetting mechanism of the auxiliary carriage with that of the main carriage when they are coupled in order to lengthen the carriage for sawing long logs or timber.

It consists in the construction, arrangement and combination of parts as hereinafter particularly described and pointed out in the claims.

In the accompanying drawing like characters designate the same parts in the several figures.

Figure 1 is a plan view of the proximate ends of two carriages with offsetting mechanism embodying the invention; Fig. 2 is a side elevation of the same; and Fig. 3 is an end elevation of the main carriage as viewed from the left relative to Figs. 1 and 2, the track rails and sills being shown in cross section.

$a$ and $b$ designate the sections of an extensible sawmill carriage or main and auxiliary carriages, the additional section or auxiliary carriage $b$ being provided for occasional or temporary use in sawing logs or timber of extra length. Each section or carriage comprises a frame $c$ which is movable transversely to the saw plane on the axles $d$ of the truck wheels $e$ and $f$, which run on the track rails $g$ and $h$, the wheels $e$ on the rear side of the carriage being grooved and the rail $g$ correspondingly formed to guide and hold the carriage in place on the track. At their proximate ends the carriages $a$ and $b$ are provided with coupling hooks $i$ and $j$, or other suitable means for connecting them together end to end. The noses of the hooks are beveled and the hook $j$ is pivoted to the carriage $a$ so as to automatically engage with the hook $i$ when the two carriages are brought together end to end, as shown. A spring $k$ inserted between a lateral projection on hook $j$ and the plate to which it is pivoted, tends to move said hook into and hold it in operative position relative to the hook $i$. A toe or projection $l$ on the hook $j$ acts by engagement with the pivot plate as a stop to limit the movement of said hook by the spring $k$ toward the hook $i$, so that when the carriages are separated the beveled noses of the hooks will be in the proper relation to each other for engagement when the carriages are brought together.

Each carriage is provided with offsetting mechanism for moving its frame $c$ with the head blocks (not shown) on which a log or timber to be sawed is placed toward the saw plane when the carriage is fed forward, and away from the saw plane when the carriage is "gigged", or moved backward so that the log or timber from which a cut has been made will not on its return movement, come in contact with the saw. The offsetting mechanism on each carriage comprises elbow-shaped or angular offsetting levers $m$, fulcrumed at their elbows to brackets $n$ on the rear sill of the frame $c$ adjacent to the ends of the carriage and pivotally connected by their shorter arms with collars $o$ loosely or revolubly mounted on truck axles $d$ between collars $p$, which are fixed on said axles. The longer rearwardly extending arms of the levers $m$ which are approximately parallel with the axles $d$, are connected on the main carriage $a$ by rods $q$ with a vertically and longitudinally movable drag shoe $r$, which is guided on the rear carriage rail $g$ by an upwardly extending flat stem $s$ loosely fitting and movable vertically and lengthwise of the carriage in a keeper or guide $t$ attached to the rear sill of the carriage frame $c$.

In the operation of the carriage, when it is started forward, the shoe $r$ tending to dwell on the rail $g$ by reason of its friction engagement therewith, causes the offsetting levers $m$ to swing forward on their pivot connections with the rods $q$ and thereby shift the carriage frame $c$ with the head blocks and log or timber thereon, toward the saw plane till the axle boxes on the front sill of the carriage frame are brought into engagement with the hubs of the front truck wheels $f$, or until such movement is arrested by other stops provided therefor. In order that the offsetting mechanism of the auxiliary carriage $b$ may be automatically coupled and operated in unison with the offsetting mechanism of the main carriage $a$, when the two carriages are brought together and coupled with each other end to end, the rods $q$ are connected by links $u$ with transverse coupling levers $v$ which are fulcrumed on brackets $w$ attached to cross pieces of the frames $c$ adjacent to the proximate ends of the carriages $a$ and $b$. The ends of the lever $v$ on carriage $a$ are bent upwardly and the ends of the lever $v$ on carriage $b$ are bent downwardly or vice versa, so that when the carriages are brought together and coupled, as shown in Figs. 1 and 2, the fulcrums of said levers will be brought into vertical alinement and their corresponding ends into engagement with each other. Under these conditions the levers $b$ will act as one, thereby connecting the offsetting levers $m$ of the two carriages and causing them to be operated in unison by the shoe $r$ on the main carriage $a$. Thus it will be seen that the offsetting devices of the two carriages are operatively connected and are disconnected without care or attention whenever the carriages are coupled and uncoupled.

Various modifications in the construction and arrangement of parts may be made within the scope of the invention as defined in the following claims.

I claim:

1. The combination of two carriages provided with means for coupling them together end to end and with offsetting mechanism, and coupling levers mounted on said carriages and connected with the offsetting mechanism thereof, said levers being arranged to be brought together and to operate in unison when the carriages are connected end to end.

2. The combination of two carriages each having a frame or log support movable on its trucks transversely to the saw plane and provided with offsetting mechanism comprising a member movable longitudinally thereof, coupling means for connecting said carriages end to end, and transverse coupling levers fulcrumed on the proximate ends of the carriages and adapted to be brought into and held in contact with each other on opposite sides of their fulcrums and to operate in unison when the carriages are coupled together, each of said levers being connected with the longitudinally movable member on the same carriage.

3. The combination with carriages having coupling means for connecting them end to end and each provided with offsetting mechanism, of coupling levers fulcrumed on the carriages and connected with the offsetting mechanism thereof, said levers being offset to permit their fulcrums to be brought into alinement and their opposite ends into engagement with each other when the carriages are connected end to end.

4. The combination with carriages having coupling means for connecting them end to end and each provided with offsetting mechanism comprising a member movable lengthwise of the carriage, of transverse coupling levers vertically fulcrumed at different levels on said carriages and offset vertically to engage with each other laterally on opposite sides of their fulcrums when the carriages are coupled end to end and the lever fulcrums are in vertical alinement, each coupling lever being connected with the longitudinally movable member of the offsetting mechanism on the same carriage.

5. The combination with saw mill carriages having automatic coupling means adapted to connect them when they are brought together end to end, and each provided with offsetting mechanism comprising a member movable lengthwise of the carriage, of brackets attached to the ends of the carriages, transverse coupling levers vertically fulcrumed between their ends at different levels on said brackets and vertically offset to engage with each other laterally at their ends when the carriages are brought together and the lever fulcrums into vertical alinement, and links connecting said levers with the longitudinally movable members of the offsetting mechanism.

In witness whereof I hereto affix my signature in presence of two witnesses.

GEORGE M. PELTON.

Witnesses:
CHAS. L. GOSS,
FRANK E. DENNETT.